(12) United States Patent
Ryu et al.

(10) Patent No.: US 8,598,733 B2
(45) Date of Patent: Dec. 3, 2013

(54) POWER MODULE AND VEHICLE HAVING THE SAME

(75) Inventors: Seunghee Ryu, Seoul (KR); Junyoung Lim, Seoul (KR); Jungbum Kim, Seoul (KR); Jinsoo Park, Seoul (KR); Dongcheol Lee, Seoul (KR); Dongwoo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 518 days.

(21) Appl. No.: 12/945,433

(22) Filed: Nov. 12, 2010

(65) Prior Publication Data

US 2011/0114397 A1 May 19, 2011

(30) Foreign Application Priority Data

Nov. 13, 2009 (KR) ........................ 10-2009-0109900

(51) Int. Cl.
*B60L 1/00* (2006.01)
(52) U.S. Cl.
USPC ......................................................... 307/9.1
(58) Field of Classification Search
USPC ......................................................... 307/9.1
See application file for complete search history.

(56) References Cited

U.S. PATENT DOCUMENTS

| | | | |
|---|---|---|---|
| 5,585,681 A | 12/1996 | Bitsche | |
| 6,198,183 B1 | 3/2001 | Baeumel et al. | |
| 7,567,053 B2 * | 7/2009 | Hauenstein | 318/801 |
| 2003/0200761 A1 * | 10/2003 | Funahashi et al. | 62/228.4 |
| 2005/0006963 A1 | 1/2005 | Takenaka et al. | |

FOREIGN PATENT DOCUMENTS

DE 20320643 U1 12/2004
EP 0968865 A1 1/2000

* cited by examiner

*Primary Examiner* — Robert L. Deberadinis
(74) *Attorney, Agent, or Firm* — McKenna Long & Aldridge LLP

(57) ABSTRACT

Provided is a power module in which a motor and a motor driving unit are efficiently configured and a vehicle having the same. The power module includes a power module case forming an external form; an inverter provided within the power module case and configured to convert a direct current (DC) power into an alternating current (AC) power; an AC power conductor provided in the power module case and connected to the inverter to cause the AC power converted by the inverter to flow therethrough; and a motor provided in the power module case and connected to the AC power conductor to receive the AC power and generate a rotational force.

9 Claims, 3 Drawing Sheets

POWER MODULE AND VEHICLE HAVING THE SAME

CROSS-REFERENCE TO RELATED APPLICATION

This application claims the benefit of Korean Patent Application No. 10-2009-0109900 filed on Nov. 13, 2009, which is incorporated by reference in their entirety herein.

1. Techanical Field

The present invention relates to a power module and a vehicle having the same, and more particularly, a power module in which a motor and a motor driving unit are efficiently configured and a vehicle having the same.

2. Background Art

A vehicle emerged by the invention of an internal combustion engine is a must-have essential for lift of human beings but causes environmental pollution and energy depletion due to huge energy consumption. Therefore, there is a tendency in that an electric vehicle that uses electricity as power or a hybrid vehicle that has a hydrogen fuel or a combination thereof with an internal combustion engine has been developed and utilized instead of the vehicle using the internal combustion engine for power.

Electric vehicles, which obtain power by driving an AC or DC motor mainly using the power of a battery, are roughly classified into a battery electric vehicle and a hybrid electric vehicle. The battery electric vehicle drives a motor using the power from a battery and when the power is exhausted, the battery is recharged. The hybrid electric vehicle charges a battery by driving an engine to produce electricity and drives an electrical motor using the electricity, thereby enabling the vehicle to move.

Recently, technique to control a motor has been developed gradually, so that a small and high efficiency system which provides a high output has been developed. As a DC motor has been replaced with an AC motor, the output and power performance (accelerating ability and maximum speed) of the electric vehicle are greatly enhanced, thereby reaching levels comparable to a gasoline vehicle. As the high output results in more-rapidly rotation, a motor becomes lightweight and miniaturized, thereby greatly reducing the mounting weight or volume thereof.

Such an AC motor requires a motor driving unit for converting a Direct Current (DC) power into an Alternating Current (AC) power, so that the efficient connection between and configurations of the AC motor and the motor driving unit has been needed.

DISCLOSURE

Technical Problem

The present invention proposes to solve the above problems.

There has been made in an effort to provide a power module in which a motor and a motor driving unit are efficiently configured and a vehicle having the same.

Technical Solution

An exemplary embodiment of the present invention provides a power module, including: a power module case forming an external form; an inverter provided within the power module case and configured to convert a direct current (DC) power into an alternating current (AC) power; an AC power conductor provided in the power module case and connected to the inverter to cause the AC power converted by the inverter to flow therethrough; and a motor provided in the power module case and connected to the AC power conductor to receive the AC power and generate a rotational force.

Another exemplary embodiment of the present invention provides a vehicle, including: a battery configured to supply a DC power; a DC power cable connected to the battery to cause the DC power to flow therethrough; a power module connected to the DC power cable and configured to convert the DC power into an AC power and generate a rotational force; and wheels rotated by the rotational force generated by the power module, wherein the power module includes a power module case forming an external form and connected to the DC power cable; an inverter provided within the power module case and configured to convert the DC power applied through the DC power cable into the AC power; an AC power conductor provided in the power module case and connected to the inverter to cause the AC power converted by the inverter to flow therethrough; and a motor provided in the power module case and connected to the AC power conductor to receive the AC power and generate a rotational force.

BEST MODE

Figure 1:
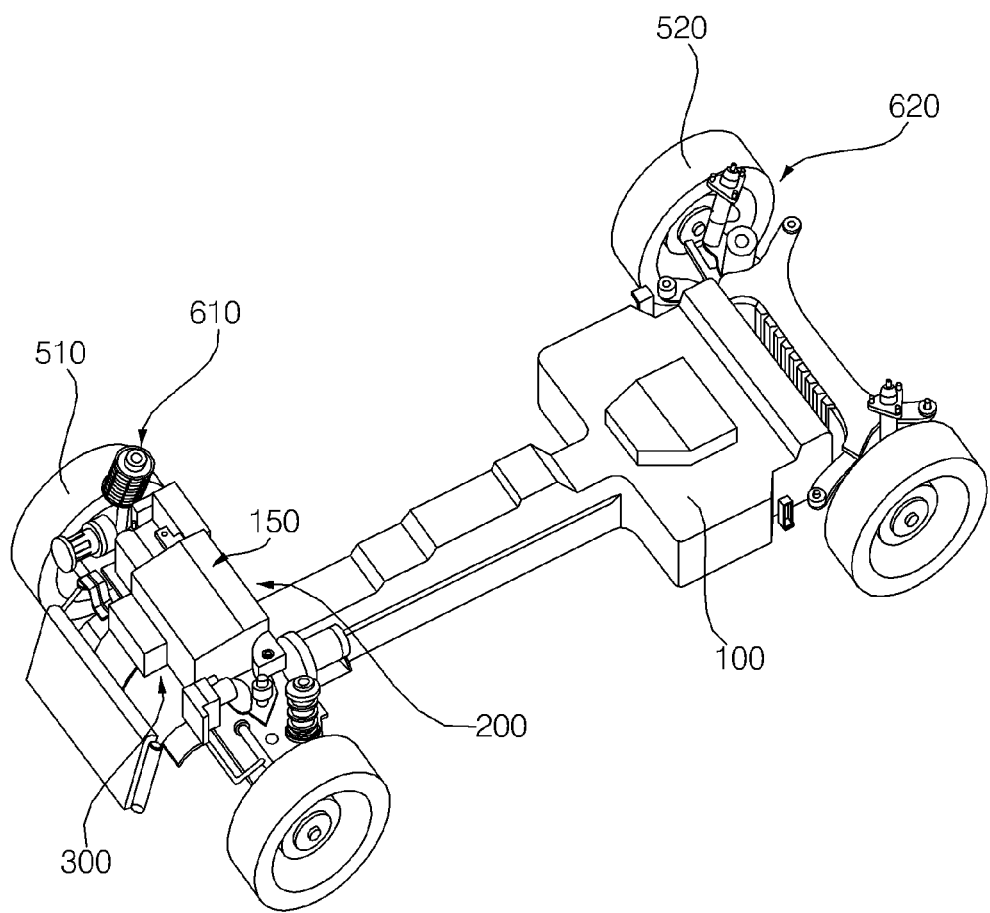
FIG. 1 is a perspective view schematically showing a motor according to an exemplary embodiment of the present invention.

The present invention will be described below with reference to the accompanying drawings. Herein, the detailed description of a related known function or configuration that may make the purpose of the present invention unnecessarily ambiguous in describing the present invention will be omitted exemplary embodiments of the present invention are provided so that those skilled in the art may more completely understand the present invention. Accordingly, the shape, the size, etc., of elements in the drawings may be exaggerated for explicit comprehension.

Hereinafter, a power module and a vehicle having the same according to exemplary embodiments of the present invention will be described in detail with reference to the accompanying drawings.

FIG. 1 is a perspective view schematically showing a vehicle according to an exemplary embodiment of the present invention.

Referring to FIG. 1, the vehicle according to an exemplary embodiment of the present invention includes a battery 100 which supplies a DC power, a power module which converts the DC power supplied by the battery 100 into an AC power to generate a rotational force, front wheels 510 and rear wheels 520 which are rotated by the power module 500, and a front suspension system 610 and a rear suspension system 620 which prevent road vibrations from being delivered to a vehicle body. Furthermore, the vehicle may further include a driving gear (not shown) which alters the rotational speed of a motor 300 according to a gear ratio.

The power module 150 includes a motor driving unit 200 which receives the DC power from the battery 100 and the motor 300 which is driven by the motor driving unit 200 to generate a rotational force.

The battery 100 supplies the DC power to the power module 150. The battery 100 may be configured by a set in which a number of unit cells are connected to each other in series or in parallel. The unit cells may be managed by a battery management system (BMS) in order to maintain a constant voltage, and output a constant voltage by the battery management system. The battery is preferably is configured by a chargeable/dischargeable secondary battery, but the present invention is not limited thereto. As the battery 100, a Nickel Metal Hydride (Ni—MH) battery, a Lithium-ion battery or the like may be mostly utilized.

The battery 100 may be disposed between a front suspension system 610 and a rear suspension system 620.

The power module 150 includes the motor driving unit 200 and the motor 300 which are formed integrally therewith and is disposed on the upper side of the front suspension system 610. The upper portion of the power module 150 is formed in a rectangular parallelepiped shape and the lower portion thereof is formed in a cylindrical shape.

The motor driving unit 200 receives the DC power from the battery 100. The motor driving unit 200 converts the DC power received from the battery 100 into the AC power and supplies the AC power to the motor 300. The converted AC power is preferably a three phase AC power.

The motor 300 is configured to include a stator (not shown) that is fixed rather than rotated and a rotor (not shown) that is rotated, and receives the AC power supplied from the motor driving unit 200 to generate a rotational force. When the AC power is applied to the motor 300, the stator of the motor 300 receives the AC power and generates a magnetic field. The magnetic field generated in the stator and the magnetic filed of a permanent magnet included in the rotor repel each other, thereby rotating the rotor. The rotational force is generated by the rotation of the rotor.

A driving gear (not shown) may be provided on one side of the motor 300. The driving gear alters the rotational force of the motor 300 according to the gear ratio. The rotational force output from the driving gear is transferred to the front wheels 510 and/or the rear wheels 520, thereby enabling the vehicle to move.

The front suspension system 610 and the rear suspension system 620 respectively support the front wheels 510 and the rear wheels 520 with respect to the vehicle body. The front suspension system 610 and the rear suspension system 620 are disposed to be spaced from each other, and the battery 100 is disposed therebetween. The power module 150 is disposed on the upper side of the front suspension system 610.

The front suspension system 610 and the rear suspension system prevent road vibrations from being delivered to the vehicle body using a spring or a damping mechanism.

A steering system (not shown) may be further provided in the front wheels 510. The steering system is an apparatus for controlling the direction of the front wheels 510 in order to drive the vehicle in a direction intended by a driver.

Figure 2:
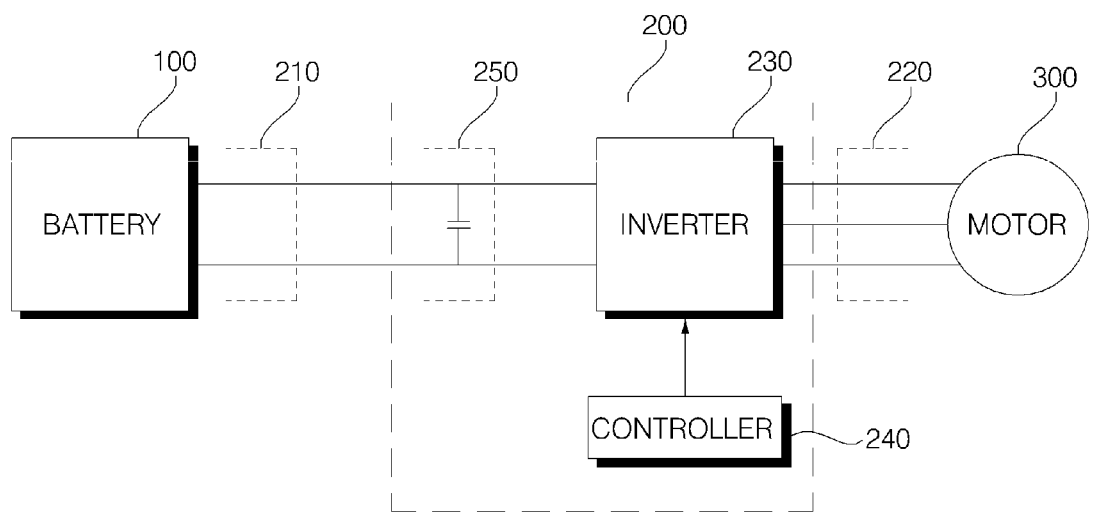
FIG. 2 is a block diagram showing a battery and a power module according to an exemplary embodiment of the present invention.

FIG. 2 is a block diagram showing a battery and a power module according to an exemplary embodiment of the present invention.

The motor driving unit 200 according to an exemplary embodiment of the present invention includes a capacitor 250 for smoothing the DC power supplied from the battery 10 and storing it, an inverter 230 for converting the DC power delivered from the capacitor 250 into the AC power and a controller 240 for controlling the inverter 230.

The capacitor 250 is a kind of condenser and smoothes the DC power supplied from the battery 100. Since the DC power supplied from the battery 100 may be not constant, the capacitor 150 stores and smoothes the DC power. The smoothed DC power is supplied to the inverter 230. The capacitor 250 may be configured by a DC-link capacitor.

The inverter 230 converts the DC power into the AC power. The inverter 230 may include a plurality of switching elements. The smoothed DC power is converted into the AC power having a predetermined frequency by the on/off operations of the switching elements, which is then applied to the motor 300. In this case, the converted AC power is preferably a three phase AC power. The conversion into the three phase AC power is described below.

In the inverter 230, an upper arm switching element and a lower arm switching element connected to each other in series constitute a pair, and three pairs of the upper and lower switching elements are connected to each other in parallel. The switching elements within the inverter 230 perform the on/off operations of respective switching elements based on switching control signals from the controller 240. Due to this, the three phase AC power having a predetermined frequency is applied to the motor 300.

The controller 240 outputs the switching control signals to the inverter 230 in order to control the operations of the switching elements of the inverter 230. The switching control signals of the controller 240 are switching control signals for pulse-width modulation (PWM) and control the operations of the above-described switching elements.

The battery 100 and the motor driving unit 200 are electrically connected to each other by a DC power cable 210. The DC power supplied from the battery 100 flows through the DC power cable 210 to be supplied to the capacitor 250. The DC power cable 210 is configured by a coating that is an insulator and a bare wire that is a conductor.

The motor driving unit 200 and the motor 300 are directly and electrically connected to each other by an AC power conductor 220. The AC power converted in the motor driving unit 200 is supplied to the motor 300 through the AC power conductor 220. The AC power conductor 220 is preferably made of a copper having excellent conductivity. The number of the AC power conductor 220 is preferably three so as to deliver the three phase AC power.

Figure 3:
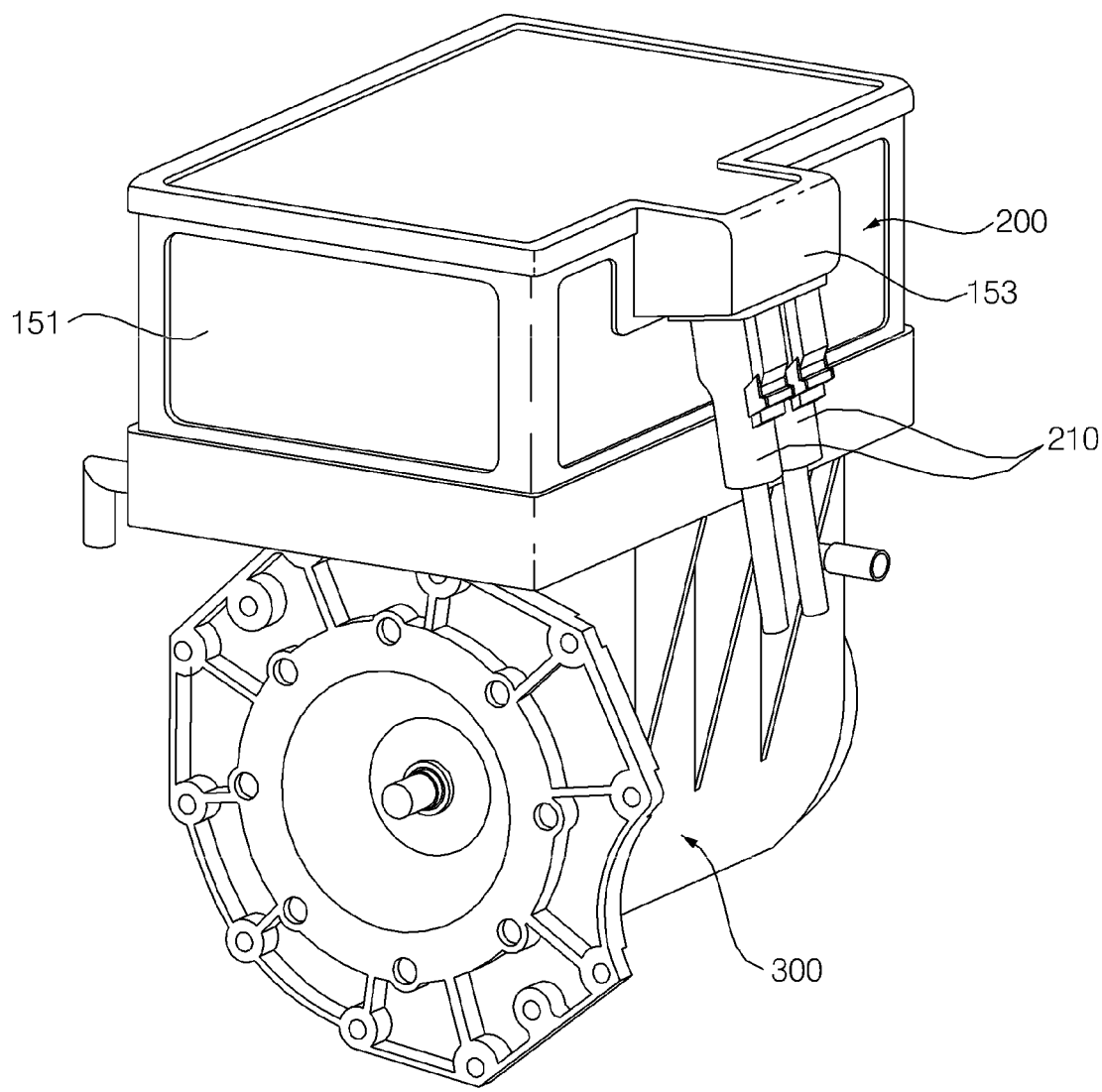
FIG. 3 is a perspective view showing a power module according to an exemplary embodiment of the present invention.

FIG. 3 is a perspective view showing a power module according to an exemplary embodiment of the present invention.

The power module 150 according to an exemplary embodiment of the present invention includes a power module case 151 forming the external form thereof, a motor driving unit 200 accommodated in the power module case, and the motor 300.

The power module case 151 is connected to the DC power cable 210. A DC power cable connection unit 153 to which the DC power cable 210 is connected may be provided in the power module case 151. The DC power cable connection unit 153 is preferably formed to ensure waterproofing and prevent the generation of earth leakage. The DC power cable connection unit 153 may be disposed on the side of the upper portion of the power module case 151. The DC power cable connection unit 153 may be formed such that the DC power cable 210 is connected from the lower side to upper side thereof.

The power module case 151 is formed such that the motor driving unit 200 is accommodated in the upper portion thereof and the motor 300 is accommodated in the upper portion thereof. The upper portion of the power module case 151 is formed in a rectangular parallelepiped shape such that the capacitor 250, the inverter 230 and the controller 240 are accommodated therein. The lower portion of the power module case 151 is formed in a cylindrical shape such that the motor 300 is accommodated therein. The upper portion and lower portion of the power module case 151 are formed integrally with each other for waterproofing and against external shocks.

Figure 4:
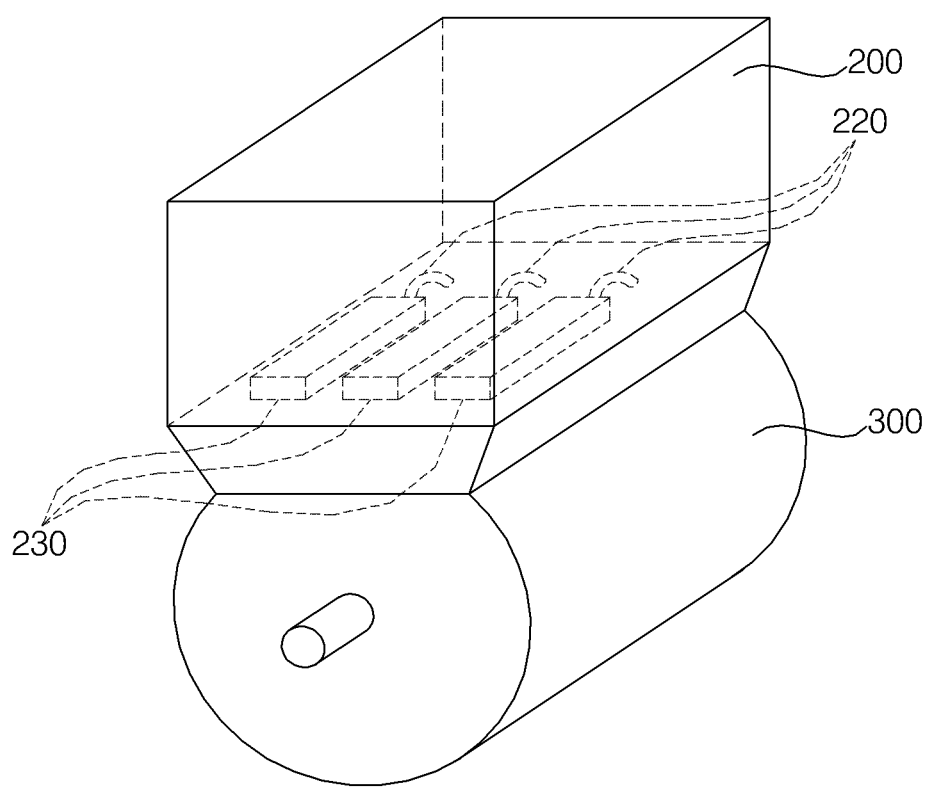
FIG. 4 is an inner configuration diagram showing a power module according to an exemplary embodiment of the present invention.

FIG. 4 is an inner configuration diagram showing a power module according to an exemplary embodiment of the present invention.

Referring to FIG. 4, the inverter 230 is preferably disposed on the upper side of the motor 300 such that the AC power conductor 220 connecting the inverter 230 to the motor 300 is shortest. The switching elements of the inverter 230 are disposed in parallel with respect to each other on the upper portion of the motor 300. The AC power conductor 220 is preferably formed in an inverted 'L' shape to connect the inverter 220 to the motor 300. The motor 30 is preferably disposed on the lower side of the inverter 230 such that the AC power conductor 220 is efficiently connected thereto.

The operations of the power module according to the present invention as configured above and the vehicle having the same are described below.

The DC power supplied by the battery 100 is applied to the power module 150 through the DC power cable 210 connected to the power module case 151. The applied DC power is smoothed by the capacitor 250 included within the power module case 151 and then converted into the AC power by the inverter 230. The AC power converted by the inverter 230 is applied to the motor 300 through the AC power conductor 220 included within the power module case 151 and then the motor 300 generates a rotational force. The front wheels 510 and/or the rear wheels 520 are rotated by the rotational force generated by the motor 300, thereby the vehicle moving.

According to the power module and the vehicle having the same, there are one or more advantages as follow.

Firstly, the waterproofing of the power module is excellent and resistance against external shocks is improved.

Secondly, contact resistance and electromagnetic disturbance are reduced in the electrical connection of the motor and the motor driving unit, thereby improving entire system efficiency Thirdly, a separate mounting structure and a cable connection are not required in the connection between the motor and the motor driving unit.

As described above, the preferred embodiments have been described and illustrated in the drawings and the description. Herein, specific terms have been used, but are just used for the purpose of describing the present invention and are not used for qualifying the meaning or limiting the scope of the present invention, which is disclosed in the appended claims. Therefore, it will be appreciated to those skilled in the art that various modifications are made and other equivalent embodiments are available. Accordingly, the actual technical protection scope of the present invention must be determined by the spirit of the appended claims.

What is claimed is:

1. A power module, comprising:
   a power module case having an upper portion formed in a rectangular parallelepiped shape and a lower portion formed in a cylindrical shape;
   a motor provided in the lower portion of the power module case having a cylindrical shape and configured to generate a rotational force;
   an inverter provided in the upper portion of the power module case having a rectangular parallelepiped shape, disposed at an upper side of the motor and configured to convert a direct current (DC) power into an alternating current (AC) power; and
   an AC power conductor provided in the upper portion of the power module case having a rectangular parallelepiped shape and formed in an inverted 'L' shape to connect the inverter to the motor.

2. The power module according to claim 1, wherein the AC power conductor is formed such that the AC power conductor connecting the inverter to the motor is shortest.

3. The power module according to claim 1, wherein the power module case includes a DC power cable connection unit connected to the DC power cable that supplies the DC power.

4. The power module according to claim 3, wherein the DC power connection unit is disposed at a side of an upper portion of the module case.

5. The power module according to claim 1, further comprising a capacitor provided in the power module case and configured to smooth the DC power supplied to the inverter.

6. The power module according to claim 1, further comprising a controller provided in the power module case and configured to control the inverter.

7. A vehicle, comprising:
   a plurality of rotatable front wheels;
   a front suspension system configured to support the plurality of front wheels;
   a plurality of rotatable rear wheels disposed to be spaced apart from the front wheels;
   a rear suspension system disposed to be spaced apart from the front suspension system and configured to support the plurality of rear wheels;
   a battery disposed between the front suspension system and the rear suspension system and configured to supply a direct current (DC) power; and
   a power module disposed at an upper side of the front suspension system, configured to convert the DC power into an alternating current (AC) power to generate a rotational force, and having an upper portion formed in a rectangular parallelepiped shape and a lower portion formed in a cylindrical shape.

8. The vehicle according to claim 7, wherein the power module includes
   a motor provided in the lower portion of the power module having a cylindrical shape and configured to generate a rotational force;
   an inverter provided in the upper portion of the power module having a rectangular parallelepiped shape, disposed at an upper side of the motor and configured to convert the DC current power into the AC power; and
   an AC power conductor provided in the upper portion of the power module having a rectangular parallelepiped shape, and formed in an inverted 'L' shape to connect the inverter to the motor.

9. The vehicle according to claim 7, wherein the power module includes
   a motor provided in the lower portion of the power module having a cylindrical shape and configured to generate a rotational force;
   an inverter provided in the upper portion of the power module having a rectangular parallelepiped shape, disposed at an upper side of the motor and configured to convert the DC current power into the AC power; and
   an AC power conductor provided in the upper portion of the power module having a rectangular parallelepiped shape, and formed such that the AC power conductor connecting the inverter to the motor is shortest.

\* \* \* \* \*